United States Patent
Fan

(10) Patent No.: US 11,766,122 B1
(45) Date of Patent: Sep. 26, 2023

(54) MOUNT FOR CLAMPING ON A DISPLAY

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 17/893,255

(22) Filed: Aug. 23, 2022

(51) Int. Cl.
  *A47B 97/00* (2006.01)
  *F16B 2/12* (2006.01)
  *F16M 13/02* (2006.01)

(52) U.S. Cl.
  CPC .............. *A47B 97/00* (2013.01); *F16B 2/12* (2013.01); *F16M 13/022* (2013.01); *A47B 2097/005* (2013.01)

(58) Field of Classification Search
  CPC ......... F16M 13/022; F16B 2/12; A47F 97/00; A47F 2097/005
  See application file for complete search history.

(56) References Cited

U.S. PATENT DOCUMENTS

| | | | |
|---|---|---|---|
| 2006/0233601 A1* | 10/2006 | Crain | G01C 15/00 403/300 |
| 2008/0103637 A1* | 5/2008 | Bliven | F16B 2/20 701/1 |
| 2009/0122474 A1* | 5/2009 | Mickey | F16M 11/126 361/679.04 |
| 2013/0092805 A1* | 4/2013 | Funk | F16M 13/00 248/274.1 |
| 2013/0228662 A1* | 9/2013 | Green | G06F 1/1607 248/229.1 |
| 2013/0279106 A1* | 10/2013 | Ergun | F16M 11/24 361/679.26 |
| 2014/0103181 A1* | 4/2014 | Duerigen | F16M 13/022 248/289.11 |
| 2017/0003712 A1* | 1/2017 | Funk | H05K 5/0204 |
| 2018/0335177 A1* | 11/2018 | Black | F16G 11/06 |
| 2021/0109426 A1* | 4/2021 | Bei | G03B 17/566 |
| 2021/0154074 A1* | 5/2021 | Shetty | A61G 1/04 |
| 2022/0253101 A1* | 8/2022 | Atias | F16M 11/14 |

* cited by examiner

*Primary Examiner* — Monica E Millner
(74) *Attorney, Agent, or Firm* — LIN & ASSOCIATES INTELLECTUAL PROPERTY, INC.

(57) ABSTRACT

A mount for clamping to a display, comprising: a main body, with a stopper and a carrier disposed at a certain distance from each other; a screw rod, rotatably mounted on the carrier and linearly movable by rotation; a top push piece, located between the stopper and the carrier, installed at one end of the screw rod and driven by the screw rod to be close to or away from the stopper; a tightening piece, rotatably installed at the screw rod and at a position far from the stopper; a support arm, having two ends, with one end pivotally connected to the screw rod and able to be clamped by the carrier and the tightening piece, and the other end clamped with a device, the device being for holding an electronic product. When clamping, the stopper contacts the front of the display and the top push piece contacts the back.

9 Claims, 10 Drawing Sheets

MOUNT FOR CLAMPING ON A DISPLAY

BACKGROUND OF THE INVENTION

1. Field of the Invention

The present invention relates generally to a technical field of device mount, and more particularly, to a mount for clamping on a display.

2. The Prior Arts

There are various types of device mounts on the market, all of which provide a support platform for clamping electronic devices. A monitor is a common electronic device at present and is a computer peripheral commodity. It is placed on a table and can display images for users to watch and various kinds of information for users to operate the computer. Electric vehicles generally also have a large screen for displaying a variety of information about the vehicle's driving. A mobile phone is a portable electronic device with multiple functions such as photography, calling, live broadcasting, Internet access, etc. Therefore, some people hope that the mobile phone can be used side by side with the display, so that the user can also notice whether there are other incoming calls on the mobile phone when viewing the display content. Therefore, it is imperative to provide a mount that is able to clamp on desktop monitors or displays in electrical vehicles with excellent stability.

SUMMARY OF THE INVENTION

The primary objective of the present invention is to provide a device mount for clamping on displays, which can be firmly fixed to a display by means of clamping, and is connected to the device to be installed by a support arm. The device can be a hand-held device, clip-type hands-free device, etc., so that the mobile phone can be more stably fixed on the side of the display.

To achieve the above-mentioned objective, the present invention provides a mount for clamping to a display, including: a main body, with a stopper and a carrier disposed at a certain distance from each other; a screw rod, rotatably mounted on the carrier and linearly movable by rotation; a top push piece, located between the stopper and the carrier, installed at one end of the screw rod and driven by the screw rod to be close to or away from the stopper; a tightening piece, rotatably installed at the screw rod and at a position far from the stopper; a support arm, having two ends, with one end pivotally connected to the screw rod and able to be clamped by the carrier and the tightening piece, and the other end clamped with a device, the device being for holding an electronic product.

In a preferred embodiment, the main body comprises a first plate piece and a second plate piece that are perpendicular to each other, and are combined with the stopper and the carrier.

In a preferred embodiment, the stopper is an L-shaped sheet, protruding from the edge of the main body.

In a preferred embodiment, the carrier has a pivot piece located on a side of the carrier away from the stopper, one end of the support arm connected to the screw rod has a sleeve, and the sleeve is butted to the pivotal piece so as to pivotally rotate with respect to each other.

In a preferred embodiment, the pivot piece is in the shape of a raised ring, a vertical sidewall in the ring has a first tooth surface, and a shaft sleeve is disposed in the middle, and the sleeve has a second tooth surface; when the sleeve is pivoted to the pivot piece and the first tooth surface is engaged with the second tooth surface, the support arm cannot be rotated.

In a preferred embodiment, one side of the top push piece is a contact surface, the opposite side is a claw-shaped ball seat with claw-like multi-lobed petals, the end of the screw rod located between the stopper and the carrier is disposed with a pivoting ball, and the pivoting ball is installed in the claw-shaped ball seat and can rotate at a plurality of angles.

In a preferred embodiment, the present invention further comprises a container fitting, the container fitting is a small basin with an upward opening, one side is extending with a hanging plate, and one side of the hanging plate has a tab facing downward.

In a preferred embodiment, at least one vertical side wall of the container fitting has a coupling portion, and the carrier has a protruding extension piece located on a side edge, and the extension piece is opposite to the coupling portion.

In a preferred embodiment, the coupling portion has a latch slot, the side and bottom of the latch slot have openings, the latch slot is T-shaped in the transverse direction, and the surface of the extension piece has at least one oblique protrusion; when the extension piece enters the latch slot, and the oblique protrusion is in contact with an outer wall of the container fitting, so as to fix the extension piece in the latch slot.

In a preferred embodiment, a display includes a front frame surface and a back case, the mount contacts the front frame surface by the stopper, and the top push piece is pressed against the back case, so that the mount is clamped and fixed to the display.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention. It should be noted that when an element is referred to as being "mounted or fixed to" another element, it means that it can be directly on the other element or an intervening element may also be present. When an element is referred to as being "connected" to another element, it means that it can be directly connected to the other element or intervening elements may also be present. In the illustrated embodiment, the directions indicated up, down, left, right, front and back etc. are relative, and are used to explain that the structure and movement of the different components in the present case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

Figure 1:
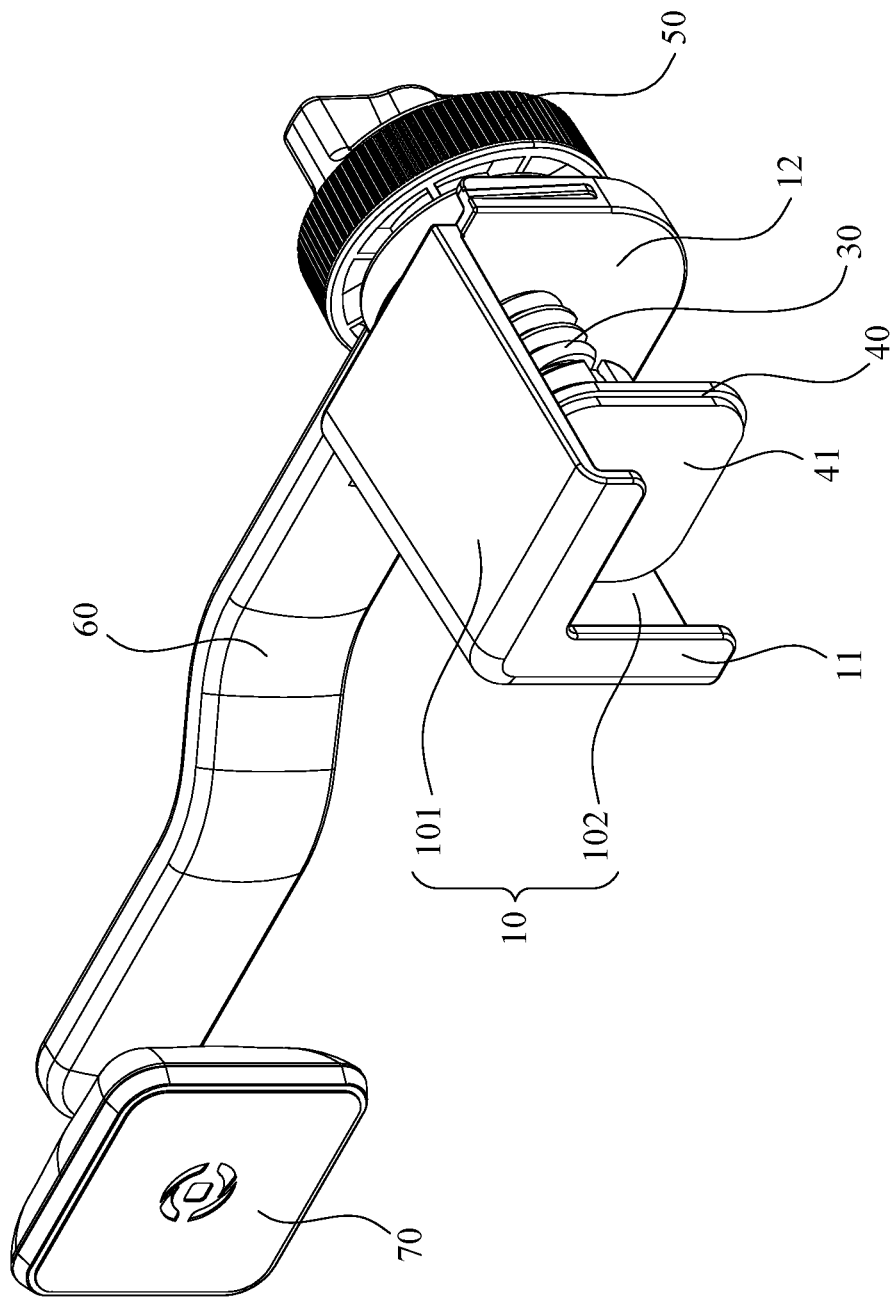
FIG. 1 is a three-dimensional view of the present invention.
Figure 2:
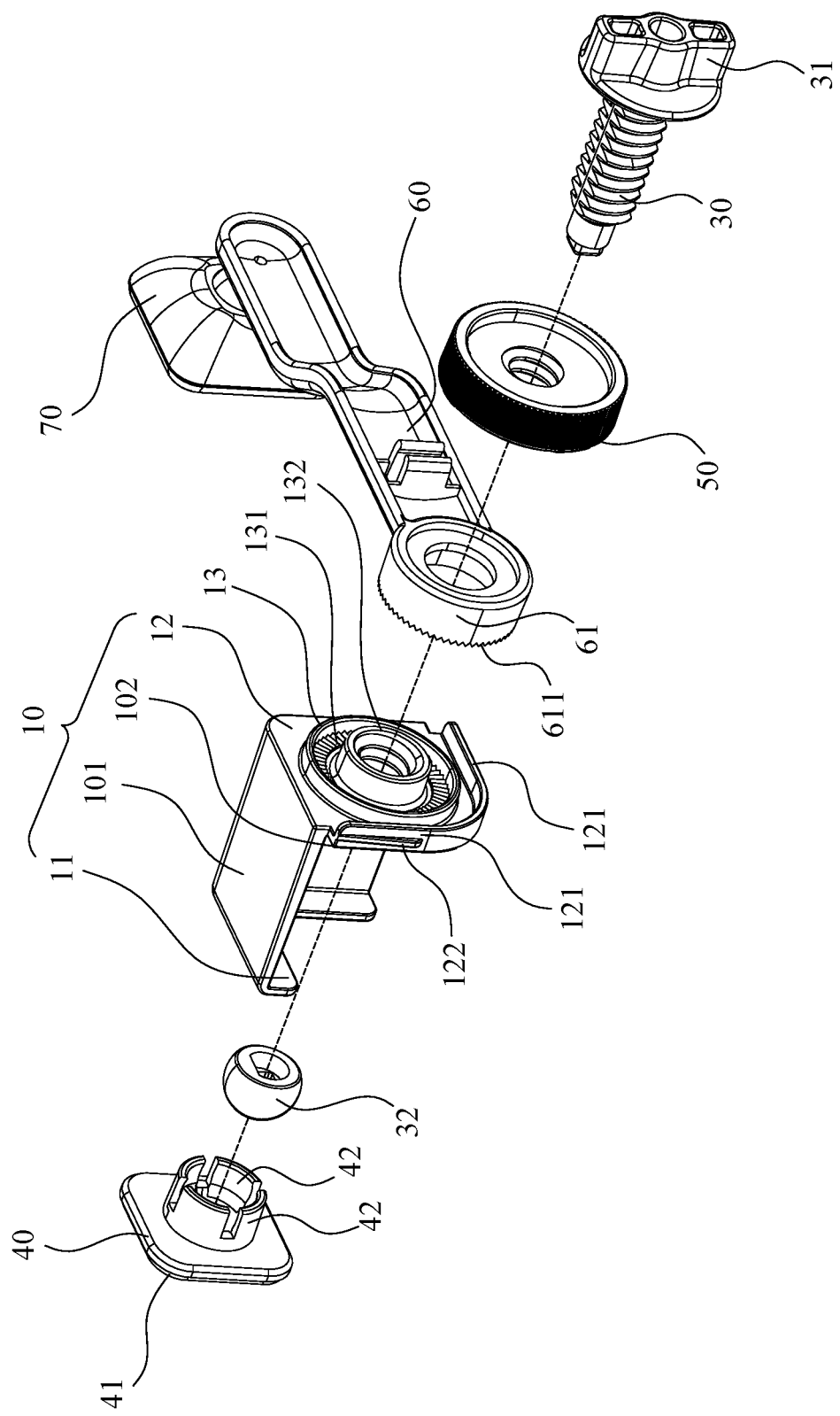
FIG. 2 is an exploded view of the present invention.
Figure 4:
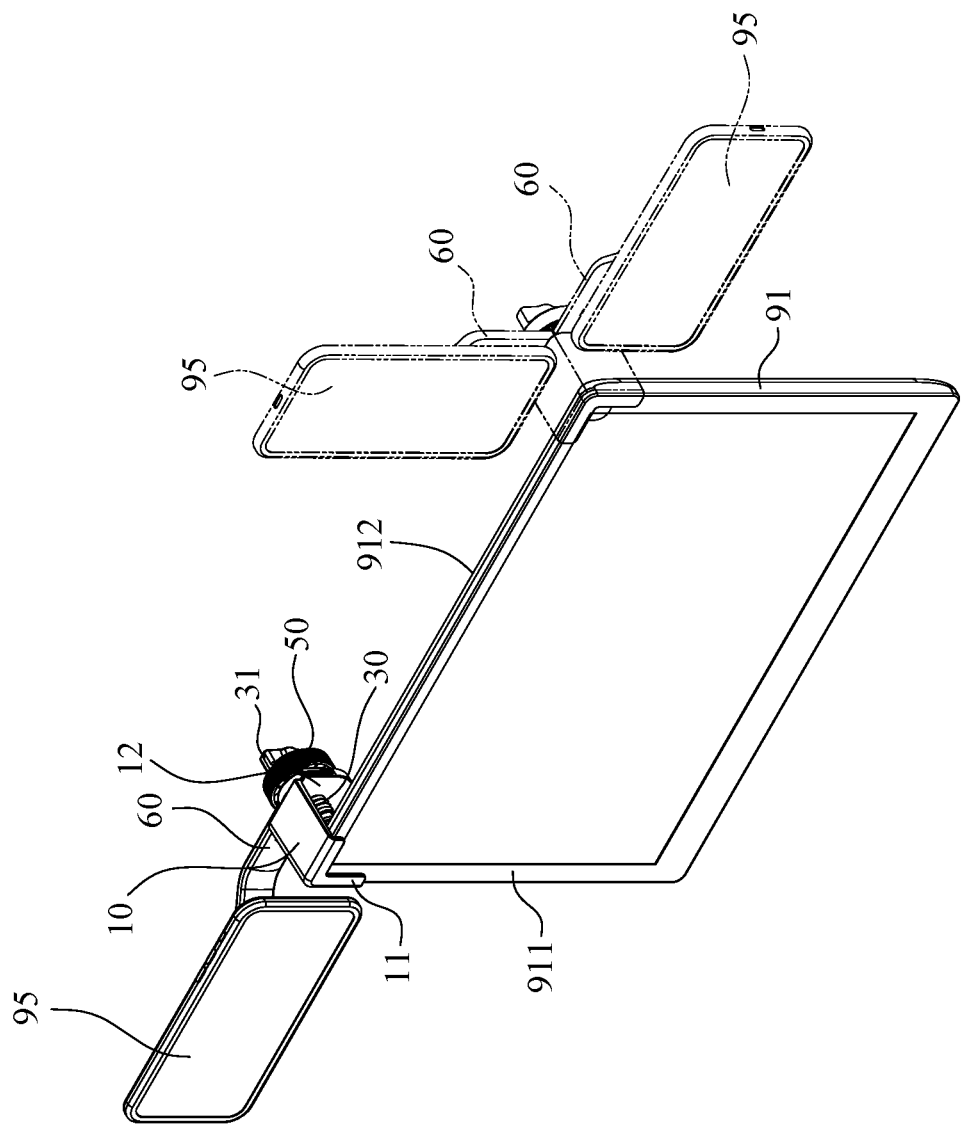
FIG. 4 is the schematic view of the present invention in use state.

As shown in FIG. 1 and FIG. 2, the three-dimensional view and the exploded view of the present invention are respectively illustrated. The mount of the present invention is clamped to a display, including: a main body 10 with a stopper 11 and a carrier 12 spaced apart at a certain distance; a screw rod 30 rotatably mounted on the carrier 12 and can be moved linearly by rotation; a top push piece 40 is located between the stopper 11 and the carrier 12. The top push piece 40 is installed on one end of the screw rod 30 and can be driven by the screw rod 30 to approach or move away from the stopper 11; a tightening piece 50 is installed on the screw rod 30, located away from the stopper 11 and rotatable; a support arm 60 has two ends, one end is pivotally connected to the screw rod 30 and clamped by the tightening piece 50 and the carrier 12, and the other end is mounted with a device 70. The device 70 can be a magnetic-type hands-free device or a clamp-type hands-free device for fixing an electronic product. In the present implementation, the electronic product is a mobile phone. As shown in FIG. 4, the mount of the present invention is used for a display 91, and the display 91 has a front frame surface 911 and a back case 912, whereby the mount of the present invention is in contact with the front frame surface 911 by the stopper 11, the top push piece 40 presses against the back case 912 to achieve the purpose of clamping and fixing the display 91. A mobile phone 95 can be fixed by the device 70, so that the user can view the display 91 and the mobile phone 95 at the same time.

Figure 3:
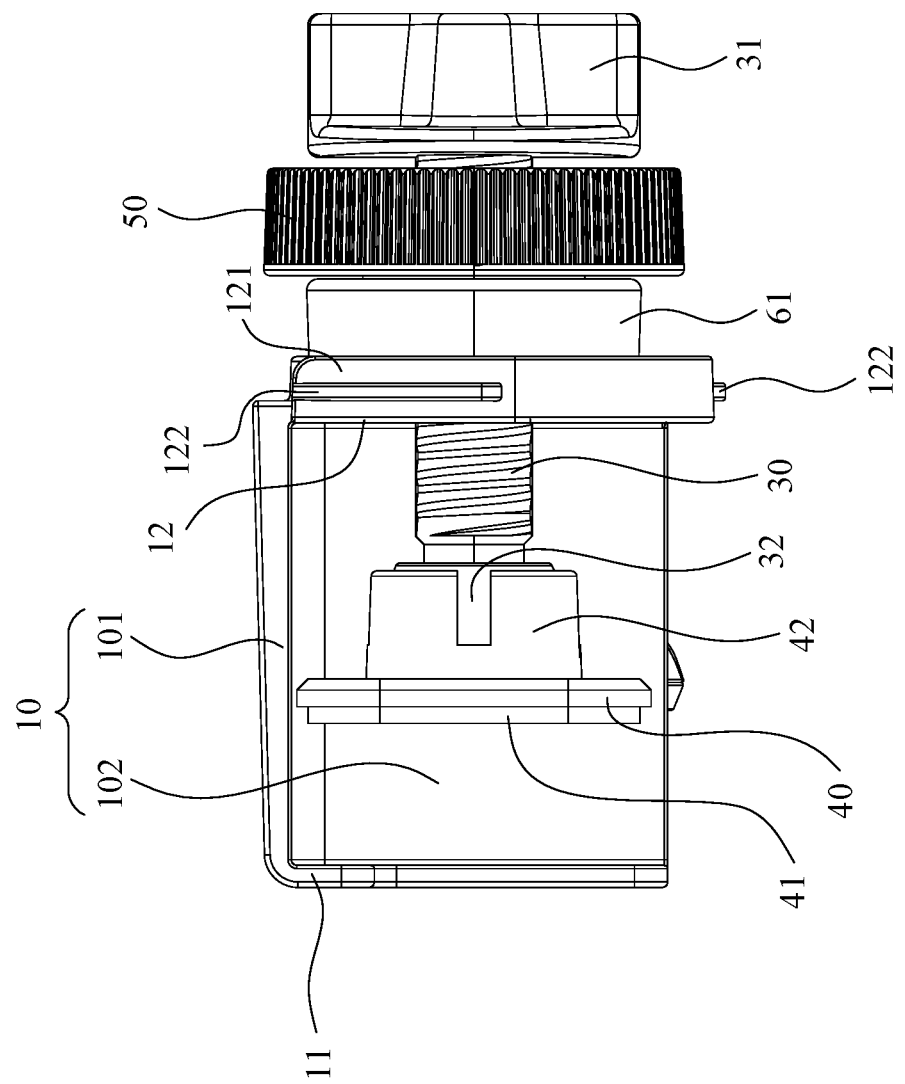
FIG. 3 is the side view of the present invention.

The following provides a detailed description on the structure of the present invention, also referring to FIG. 3:

The main body 10 is a plate body for connecting the stopper 11 and the carrier 12. In the present embodiment, the main body 10 is composed of a first plate piece 101 and a second plate piece 102 that are perpendicular to each other. The stopper 11 is in the shape of an L-shaped sheet, protruding from the front edge of the main body 10, and the stopper 11 is in surface contact with the front frame surface 911 at the corner of the display 91 during clamping. The size of the carrier 12 is much larger than that of the stopper 11, and an inner threaded hole is provided in the center for the screw rod 30 to be mounted thereon. In addition, the other side of the carrier 12 has a pivot piece 13. The pivot piece 13 is arranged on a side of the carrier 12 away from the stopper 11. The main body of the pivot element 13 is ring-shaped, and the vertical sidewall of the ring has a first tooth surface 131 and a shaft sleeve 132 in the middle. The pivot piece 13 is used for pivotally connecting with the support arm 60. The main body 10 and the stopper 11, the carrier 12, and the pivot piece 13 are all integrally formed.

The screw rod 30 is provided with an external thread on the periphery, and has two ends, one end has an integrally formed knob 31, and the other end is provided with a pivot ball 32 that can be locked. The size of the pivot ball 32 must be larger than one-half of a full sphere, but less than four-fifths of a full sphere.

The top push piece 40 is located between the stopper 11 and the carrier 12 and can be moved. In the present embodiment, the top push piece 40 is installed at one end of the screw rod 30 and is driven by the screw rod 30. In addition, since the back case 912 of the display 91 may be a flat surface, an inclined surface or a curved surface, the present invention allows the top push piece 40 to be adjusted at multiple angles. In the present embodiment, one side of the top push piece 40 is a flat contact surface 41, and the opposite side is a claw-shaped ball seat 42 with multi-lobed claw-shaped petals. The opening of the claw-shaped ball seat 42 is smaller than the maximum diameter of the pivot ball 32 and the depth correspond to the outer diameter of the pivot ball 32. During assembly, the screw rod 30 is rotated into the end of the carrier 12 where the pivot piece 13 is located between the stopper 11 and the carrier 12, so as to prevent the screw rod 30 from separating from the carrier 12 when the screw rod 30 rotates. Then, the pivot ball 32 is forcibly pressurized and plugged into the claw-shaped ball seat 42 so as to make the top push piece 40 have the ability to adjust in multiple angles and orientations. The contact surface 41 can be provided with a non-slip pad to increase the frictional force during contact.

The tightening piece 50 is screwed to the screw rod 30 for locking the support arm 60 to the carrier 12, and has an inner thread hole in the center.

The support arm 60 is an extension arm, which is curved in the present embodiment, but not limited thereto, and the shape may be changed according to actual applications. The support arm 60 has two ends, one end is pivotally connected to the screw rod 30 and can be screwed and fixed by the tightening piece 50, and the other end can be installed with a device 70, which is responsible for holding a mobile phone. The structure of this end and the device can be of any existing types, for example, the device 70 shown in the figure is a magnetic-type hands-free device. However, it can also be a clamp-type hands-free device, or a structure with connecting bumps or screw holes, used to install webcams or other different electronic products, etc. The present invention is not limited thereto, and the design can be freely changed according to the applications. One end of the support arm 60 connected to the screw rod 30 has a sleeve 61, and the end of the sleeve 61 facing the pivot piece 13 has a radial second tooth surface 611, and the second tooth surface 611 corresponds to the first tooth surface 131. During assembly, the tightening piece 50 is firstly screwed to the screw rod 30, the sleeve 61 is butted to the pivot piece 1, and then the screw rod 30 is screwed to the carrier 12 through a hole in the center of the sleeve 61. In the unlocked state, the distance between the tightening piece 50 and the carrier 12 is greater than the thickness of the sleeve 61, so that the support arm 60 can be adjusted to any angle. After the support arm 60 is adjusted, the tightening member 50 is rotated on the screw rod 30 to continuously approach the sleeve 61, and finally tightened, so that the first tooth surface 131 and the second tooth surface 611 are engaged with each other. As such, the relative positions of the support arm 60 and the carrier 12 can be stably fixed.

Figure 5:
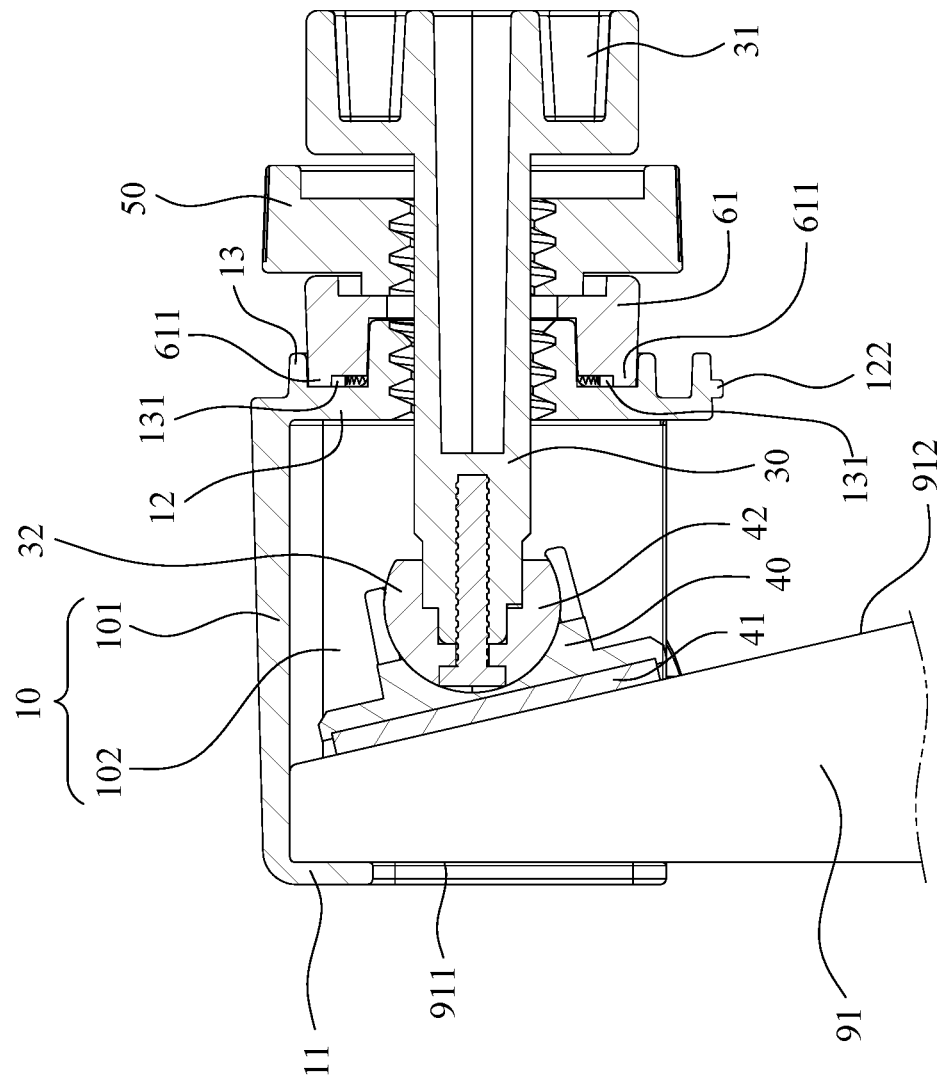
FIG. 5 is a cross-sectional view of the present invention in clamping state.

As shown in FIG. 4 and FIG. 5, the present invention is a mount for clamping to a display. During use, the stopper 11 of the main body 10 contacts the front frame surface 911 at the corner of the display 91, and then the knobs 31 is rotated so that the screw rod 30 rotates forward continuously until the top push piece 40 gets in contact with the back case 92. Because the top push piece 40 can be rotated, it can also be tightly attached to the inclined surface of the back case 90 to achieve clamping and fixing. Then, the relative positions of the support arm 60 and the carrier 12 are adjusted, and then the tightening piece 50 is rotated to approach the support arm 60. Because the first tooth surface 131 and the second tooth surface 611 engage with each other, the support arm 60 is fixed on the carrier 12 and achieves the objective of fixing the mount of the present invention to the display 91. In addition, as shown by the dotted line in FIG. 4 (right position), in another installation example, because the main body 10 has a right-angled plate shape, and the stopper 11 is also L-shaped, the user can choose to fix the mount on the upper left corner or the upper right corner of the display 91, and the mobile phone 95 can also be placed outside or above the display 91 after the position of the support arm 60 is adjusted.

Figure 6:
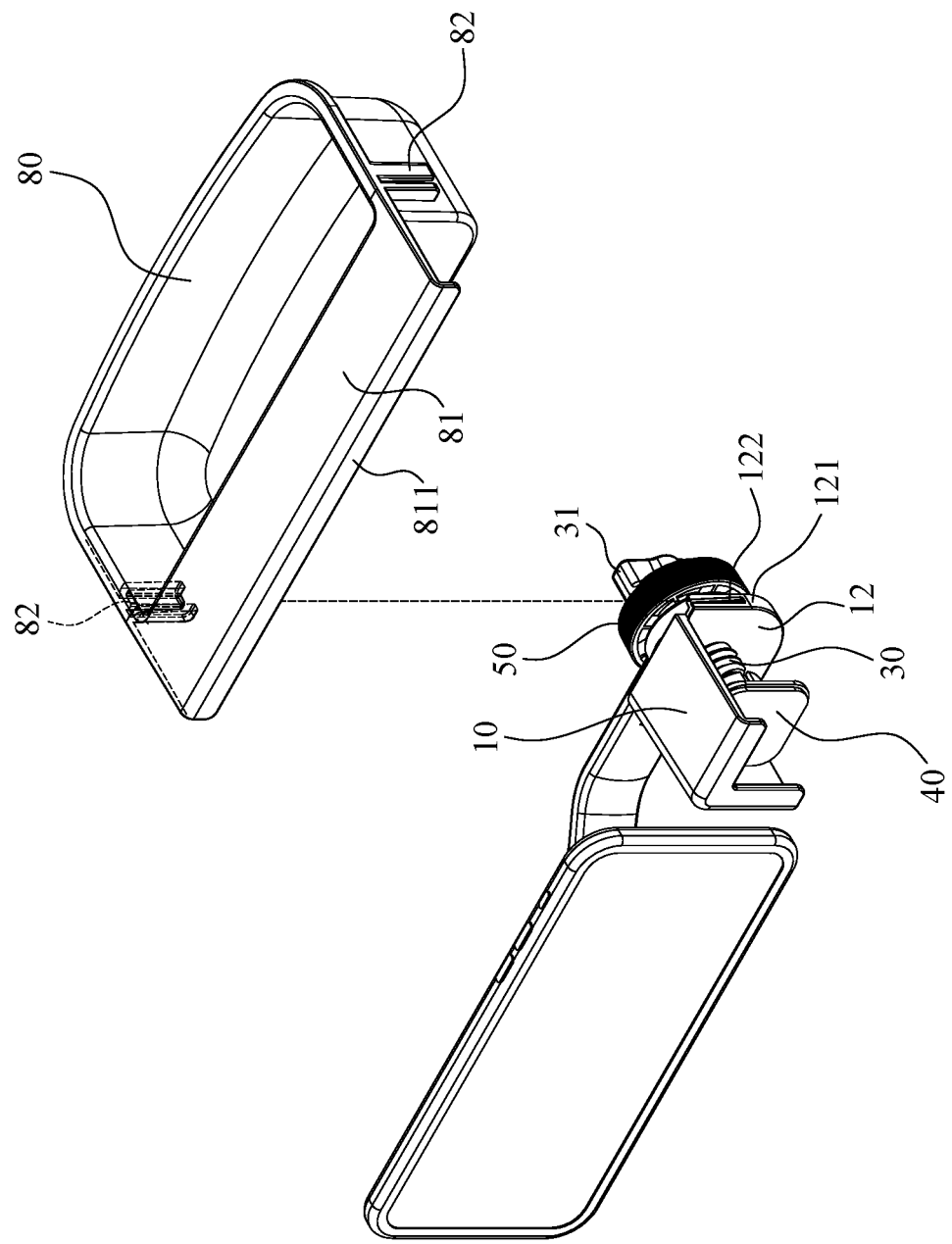
FIG. 6 is an exploded view of the present invention and a container fitting.
Figure 7A:
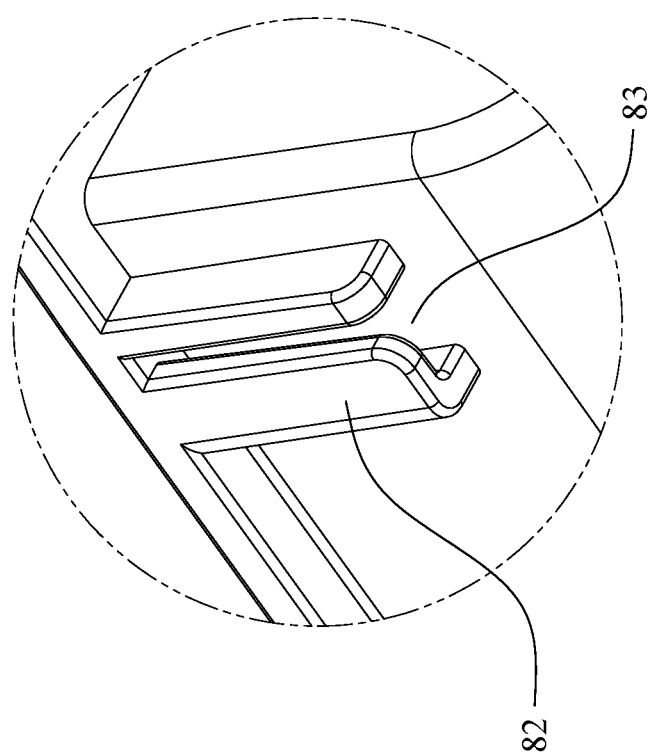
FIG. 7A is an enlarged view of the coupling portion of the container fitting of the present invention.
Figure 7B:
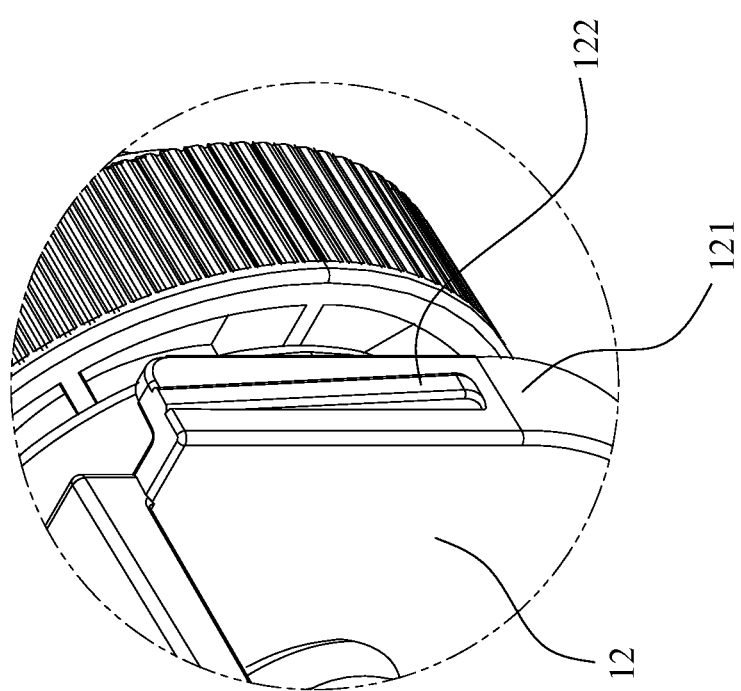
FIG. 7B is an enlarged view of the extension piece of the present invention.

The mount of the present invention can also be used with different selected accessories to increase the convenience of use. As shown in FIG. 6, the present invention also includes a container fitting 80, which is a small basin with an upward opening, and a hanging plate 81 extends from one side, and one side of the hanging plate 81 has a tab 811 facing downward. The tab 811 is also in contact with the front frame 911 of the display 91. At least one vertical side wall on both sides of the container fitting 80 has a coupling portion 82. As shown in FIG. 7A, the coupling portion 82 has a latch slot 83. In addition, as shown in FIG. 7B, the carrier 12 has an extension piece 121 located on the side. The extension piece 121 protrudes toward the pivot piece 13. The surface of the extension piece 121 has at least one oblique protrusion piece 122. The oblique protrusion piece 122 is gradually increasing from top to bottom.

Figure 7C:
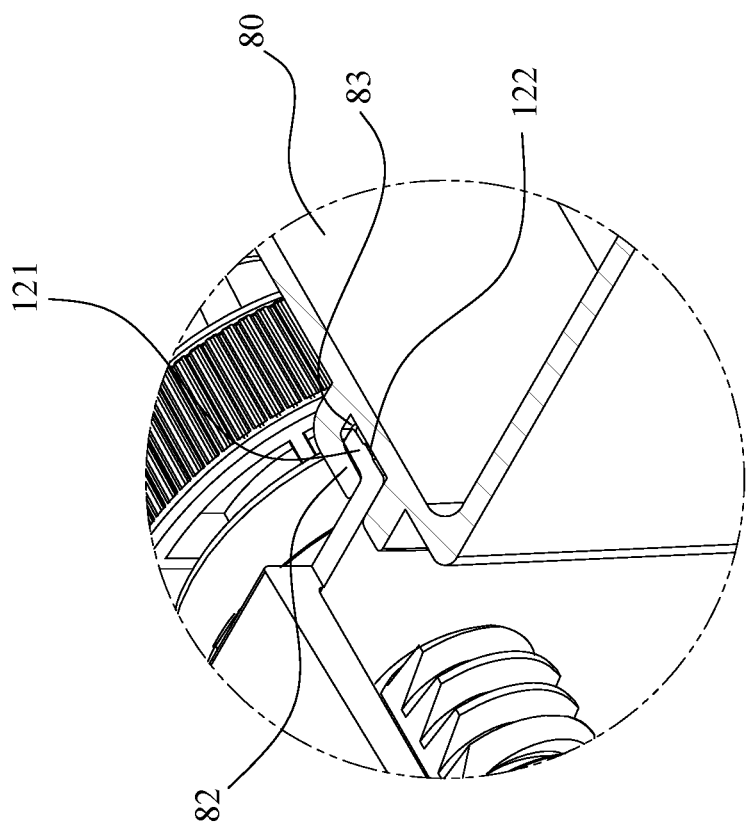
FIG. 7C is a partial cross-sectional schematic view of the extension piece and the coupling part of the present invention.
Figure 8:
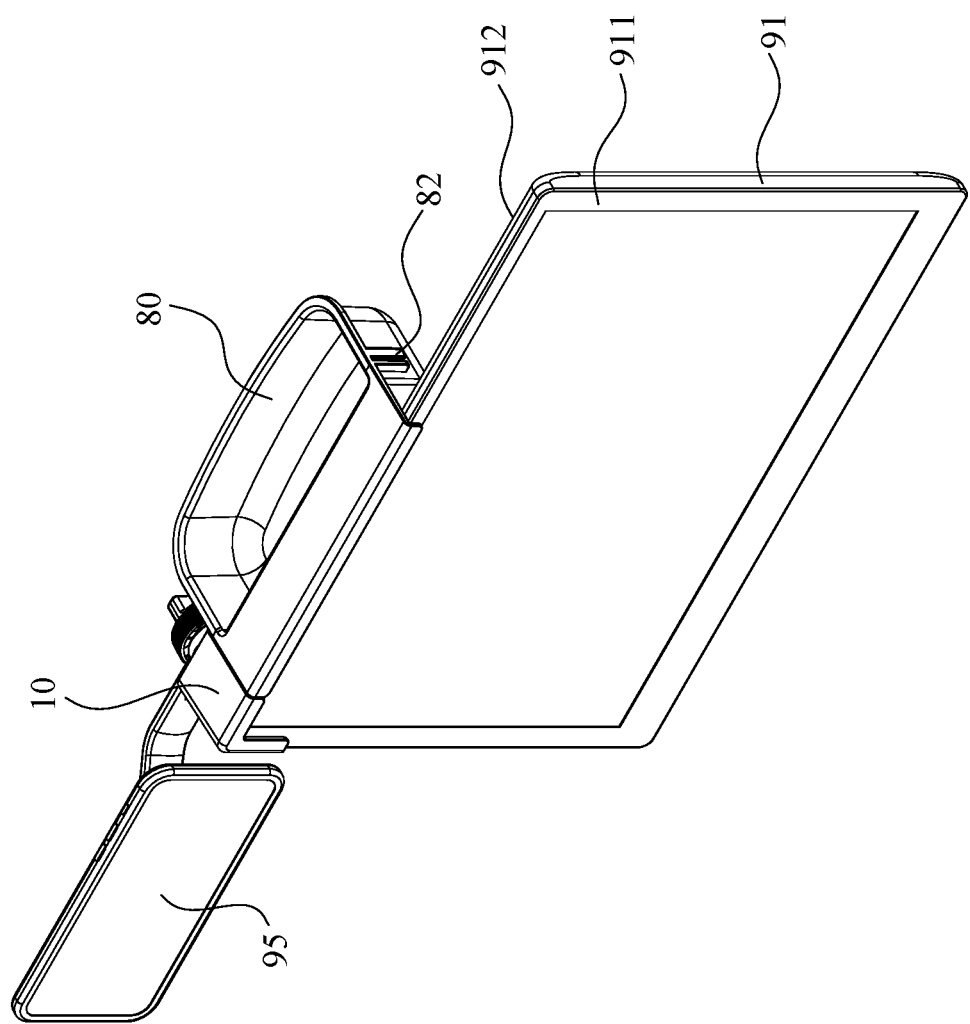
FIG. 8 is another use state diagram for the present invention.

As shown in FIG. 8, after the mount is locked and fixed to the display 91, the container fitting 80 can be aligned with the extension piece 121 with the coupling portion 82, as shown in FIG. 7C, along with the extension piece 121 into the latch slot 83, the oblique protrusion piece 122 will also contact the outer wall of the container fitting 80 to increase the tightness after engagement. As such, the container fitting 80 can be fixed on the top surface of the display 91, and the container fitting 80 can provide a space for the user to place small items.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A mount for clamping to a display, comprising: a main body, with a stopper and a carrier disposed at a certain distance from each other; a screw rod, rotatably mounted on the carrier and linearly movable by rotation; a top push piece, located between the stopper and the carrier, installed at one end of the screw rod and driven by the screw rod to be close to or away from the stopper; a tightening piece, rotatably installed at the screw rod and at a position far from the stopper; a support arm, having two ends, with one end pivotally connected to the screw rod and able to be clamped by the carrier and the tightening piece, and the other end clamped with a device, the device being for holding an electronic product;

wherein the carrier has a pivot piece located on a side of the carrier away from the stopper, one end of the support arm connected to the screw rod has a sleeve, and the sleeve is butted to the pivotal piece so as to pivotally rotate with respect to each other.

2. The mount for clamping to a display according to claim 1, wherein the main body comprises a first plate piece and a second plate piece that are perpendicular to each other, and are combined with the stopper and the carrier.

3. The mount for clamping to a display according to claim 1, wherein the stopper is an L-shaped sheet, protruding from the edge of the main body.

4. The mount for clamping to a display according to claim 1, wherein the pivot piece is in the shape of a raised ring, a vertical sidewall in the ring has a first tooth surface, and a shaft sleeve is disposed in the middle, and the sleeve has a second tooth surface; when the sleeve is pivoted to the pivot piece and the first tooth surface is engaged with the second tooth surface, the support arm cannot be rotated.

5. A mount for clamping to a display, comprising: a main body, with a stopper and a carrier disposed at a certain distance from each other; a screw rod, rotatably mounted on the carrier and linearly movable by rotation; a top push piece, located between the stopper and the carrier, installed at one end of the screw rod and driven by the screw rod to be close to or away from the stopper; a tightening piece, rotatably installed at the screw rod and at a position far from the stopper; a support arm, having two ends, with one end pivotally connected to the screw rod and able to be clamped by the carrier and the tightening piece, and the other end clamped with a device, the device being for holding an electronic product;

wherein one side of the top push piece is a contact surface, the opposite side is a claw-shaped ball seat with claw-like multi-lobed petals, the end of the screw rod located between the stopper and the carrier is disposed with a pivoting ball, and the pivoting ball is installed in the claw-shaped ball seat and can rotate at a plurality of angles.

6. A mount for clamping to a display, comprising: a main body, with a stopper and a carrier disposed at a certain distance from each other; a screw rod, rotatably mounted on the carrier and linearly movable by rotation; a top push piece, located between the stopper and the carrier, installed at one end of the screw rod and driven by the screw rod to be close to or away from the stopper; a tightening piece, rotatably installed at the screw rod and at a position far from the stopper; a support arm, having two ends, with one end pivotally connected to the screw rod and able to be clamped by the carrier and the tightening piece, and the other end clamped with a device, the device being for holding an electronic product and the mount further comprising a container fitting, the container fitting being a small basin having an upward opening and one side extending with a hanging plate, and one side of the hanging plate having a tab facing downward.

7. The mount for clamping to a display according to claim 6, wherein at least one vertical side wall of the container fitting has a coupling portion, and the carrier has a protruding extension piece located on a side edge, and the extension piece is opposite to the coupling portion.

8. The mount for clamping to a display according to claim 7, wherein the coupling portion has a latch slot, the side and bottom of the latch slot have openings, the latch slot is T-shaped in the transverse direction, and the surface of the extension piece has at least one oblique protrusion; when the extension piece enters the latch slot, and the oblique protrusion is in contact with an outer wall of the container fitting, so as to fix the extension piece in the latch slot.

9. The mount for clamping to a display according to claim 1, wherein the display includes a front frame surface and a back case, the mount contacts the front frame surface by the stopper, and the top push piece is pressed against the back case, so that the mount is clamped and fixed to the display.

* * * * *